UNITED STATES PATENT OFFICE.

JOHANN CARL WILHELM FERDINAND TIEMANN, OF BERLIN, GERMANY, ASSIGNOR TO HAARMANN & REIMER, OF HOLZMINDEN, GERMANY.

IONONE DERIVATIVE AND PROCESS OF MAKING SAME.

SPECIFICATION forming part of Letters Patent No. 658,411, dated September 25, 1900.

Application filed April 20, 1898. Serial No. 678,285. (No specimens.)

*To all whom it may concern:*

Be it known that I, JOHANN CARL WILHELM FERDINAND TIEMANN, a subject of the King of Prussia, Emperor of Germany, residing at Berlin, in the Kingdom of Prussia, German Empire, have invented certain new and useful Improvements in Processes of Manufacture of Pseudo-Ionone and Ionone, (for which I have applied for a patent in Germany, and which application is dated March 30, 1898,) of which the following is a specification.

In my United States Patent No. 556,943 I have shown that citral and acetone subjected to the action of alkaline agents are condensed into an unsaturated aliphatic ketone of the formula $C_{13}H_{20}O$, called by me "pseudo-ionone," and that when the same is treated by acids it is transformed into an isomeric ketone-ionone, which has a smell of violets. The ethyl acetyl acetate (ethylaceto-acetate) is the ethyl carboxylic derivative of acetone. It is therefore clear that citral and ethyl-acetyl-acetate are capable of being condensed into an ethyl-carboxylic derivative of pseudo-ionone, which derivative treated by acids, as set forth in the United States Patents Nos. 556,943 and 556,944, should form an ethyl carboxylic derivative of ionone. The experiments which have been made in this respect have not for a long time given the anticipated result, because the aliphatic ethyl citralidene aceto-acetate first resulting from the condensation of citral with ethyl acetyl-acetate is turned very easily (for instance, by distilling at a reduced pressure) into a chemical compound, the atoms or constituent parts of which are arranged in a manner entirely differing from that of the atoms or constituent parts of the molecule of ionone. I have recently discovered that this transposition preventing the formation of derivatives of ionone from aliphatic ethyl citralidene-acetone-acetate can be avoided if this compound is immediately after its production converted into an ethylic ether of ionone carbonic acid by means of acids, care being taken that it does not get heated to too high a temperature. It has been shown in the United States Patent No. 600,429 that by treating pseudo-ionone by means of concentrated sulphuric acid at a low temperature an ionone is obtained which contains a large amount of that variety of ionone which is called "beta-ionone" or "iso-ionone."

If the aliphatic ethyl citralidene-aceto-acetate is treated at a low temperature with concentrated sulfuric acid, it is turned into an ethylic ether of ionone-carbonic acid, which, like the ionone carbonic acid obtained therefrom by saponification, is derived chiefly from beta-ionone, (or iso-ionone.) This ionone carbonic acid gives, on the splitting off of carbonic acid, an ionone from which pure beta-ionone (iso-ionone) can be easily obtained by the means set forth in the United States Patent No. 600,429.

The method hereinbefore described of production of the derivatives of pseudo-ionone and ionone from ethyl acetyl-acetate and citral, as well as the preparation of the variety of ionone known as "beta-ionone," (iso-ionone,) is as follows: The aliphatic ethyl citralidene-aceto-acetate $C_{16}H_{24}O_3$ is obtained, for instance, by heating for five or six hours in a steam-bath a mixture consisting of one hundred and sixteen parts citral, ninety-eight parts ethyl acetyl-acetate, one hundred and fifty parts glacial acetic acid, one hundred and fifty parts anhydrous sodium acetate, and one hundred and fifty parts acetic anhydride. The product of the reaction is mixed with ether or another suitable extracting substance and shaken repeatedly with an aqueous solution of soda. The ether is evaporated and the residue exposed to a current of steam not too strong so long as the distillate has a distinct smell of citral. The current of steam is increased, and the entrained ethyl-citralidene-aceto-acetate, which under these conditions is neither decomposed nor altered, is collected separately. The aliphatic ethyl-citralidene-aceto-acetate (ethylic ether of pseudo-ionone-carbonic acid) is converted into the corresponding derivative of ionone by means of acids. This conversion takes place without formation of troublesome by-products under the following conditions: Ethylic ether of ionone carbonic acid $C_{16}H_{24}O_3$. Aliphatic ethyl citralidene-aceto-acetate is allowed to drop slowly into five times its quantity of concentrated sulfuric acid well cooled by ice. Special care is to be taken that the temperature does not exceed 7° or get under 2° during the process of inversion. The mixture is left to itself for ten minutes and then poured on ice. The reaction product isolated by ether or any other extracting means is distilled in a current of steam and afterward subjected to a methodical fractional distillation under reduced pressure. The ethylic ether of ionone carbonic acid is advantageously first boiled under a pressure of about one hundred millimeters. Under this pressure it passes over at about 215°. Under a pressure of eleven millimeters the pure ether boils at about 160°. It has at 19° a specific gravity of 1.0387 and an index of refraction $n/D = 1.5110$. At low temperature the ether crystallizes, and crystallized from ligroine of a low boiling-point at a low temperature it melts at 49°.

*Ionone-carbonic acid* $C_{14}H_{20}O_3$.—The aforesaid ethylic ether of ionone-carbonic acid $C_{16}H_{24}O_3$ is easily saponified. To this effect some twenty parts of this compound are heated for ten to fifteen minutes in a steam-bath with a solution of fifteen parts of potassic hydrate in one hundred and fifty parts of alcohol. This is diluted with water acidified, and the ionone carbonic acid which has been set free is shaken out with a large amount of ether. It dissolves with difficulty in ether, alcohol, and benzene. Twenty parts of it require for their solution about one thousand parts of boiling alcohol. The acid crystallized in alcohol melts at 200°.

*Beta-ionone (iso-ionone)* $C_{13}H_{20}O$.—The hereinbefore-described ionone carbonic acid is, as already stated, chiefly derived from the variety of ionone known as "beta-ionone" or "iso-ionone." By heating the said ionone carbonic acid in an atmosphere of carbonic acid at the ordinary atmospheric pressure up to and even a little above its melting-point the carbonic acid is split off and an oily distillate obtained, which consists chiefly of beta-ionone. The same splitting off takes place gradually in heating the acid with alkaline lye.

If the ionone obtained is dissolved in alcohol and to this solution an aqueous one of semicarbazid hydrochlorate and sodium acetate is added, the semicarbazone of beta-ionone is soon separated. From this semicarbazone beta-ionone is easily separated by the process set forth in the United States Patent No. 600,429.

Having now particularly described and ascertained the nature of this invention and in what manner the same is to be performed, I declare that what I claim is—

1. The herein-described process of obtaining an intermediate product for the manufacture of ionone which consists in producing aliphatic ethyl citralidene aceto-acetate, converting at a low temperature into ethylic ether of ionone by acid, treating with an alkaline reagent to obtain ionone carbonic acid, splitting off carbonic acid, and separating the final product.

2. The herein-described process of obtaining ethylic ether of ionone carbonic acid, which consists in treating aliphatic ethyl citralidene aceto-acetate with a concentrated mineral acid, while maintaining the reagents at a low temperature.

3. The herein-described process of obtaining ethylic ether of ionone carbonic acid which consists in slowly adding a quantity of aliphatic ethyl citralidene aceto-acetate to a larger quantity of concentrated sulfuric acid cooled by ice, keeping the mixture at a temperature substantially between 2° and 7° for a few minutes and pouring the mixture on ice.

4. The herein-described process of obtaining aliphatic ethyl-citralidene aceto-acetate (ethylic-ether of pseudo-ionone-carbonic acid), which consists in heating a mixture of citral, ethyl acetyl-acetate, glacial acetic acid, anhydrous sodium acetate and acetic anhydrid, extracting the product and subjecting it to fractional distillation.

5. The herein-described process of obtaining ionone carbonic acid which consists in heating ethylic ether of ionone carbonic acid in an alcoholic solution of an alkali, and adding a mineral acid.

6. The herein-described process of obtaining ionone carbonic acid which consists in heating ethylic ether of ionone carbonic acid in a steam-bath with a solution of potassic hydrate in alcohol, acidifying, and extracting with ether.

7. The herein-described process of obtaining the semicarbazone of b-ionone, which consists in heating ionone carbonic acid above its melting-point in an atmosphere of carbonic acid, dissolving the product in alcohol, and adding an aqueous solution of semicarbazid hydrochlorate and sodium acetate.

8. As a new article of manufacture, the herein-described ethylic ether of ionone carbonic acid derived from aliphatic ethyl citralidene aceto-acetate, being a yellow oily liquid having a fragrant odor, boiling at 215° under a pressure of one hundred millimeters, and at 160° under a pressure of eleven millimeters, having at 19° a specific gravity of 1.0387 and an index of refraction of $n/D = 1.5110$, crystallizing at low temperatures, melting at 49° when crystallized from ligroine at a low boiling-point, and having the formula $C_{16}H_{24}O_3$.

9. As a new article of manufacture, the herein-described ionone carbonic acid derived from ethylic ether of ionone carbonic acid, in yellowish-white crystals melting at 200° centigrade soluble with difficulty in ether, alcohol and benzene, soluble in boiling alcohol, and having the formula $C_{14}H_{20}O_3$.

10. The herein-described process of obtaining beta-ionone (also called iso-ionone) consisting in first producing aliphatic ethyl-citralidene aceto-acetate (ethylic-ether of pseudo-ionone carbonic acid) by heating a mixture of citral, ethyl-acetyl-acetate, glacial acetic acid, anhydrous sodium acetate, and acetic-anhydride, extracting the product and subjecting to fractional distillation; second, obtaining ethyl ether of ionone carbonic acid by slowly adding a quantity of the so-produced aliphatic ethyl citralidene-aceto-acetate to a larger quantity of concentrated sulfuric acid cooled by ice, keeping the mixture at a temperature substantially between 2° and 7° for a few minutes and pouring the mixture on ice; third, obtaining ionone carbonic acid from its said ethyl ether by heating this latter in a steam-bath with a solution of potassic hydrate in alcohol, adding a mineral acid and extracting with ether; fourth, obtaining the semicarbazone of beta-ionone by heating said ionone carbonic acid above its melting-point in an atmosphere of carbonic acid, dissolving the product in alcohol and adding an aqueous solution of semicarbazid hydrochlorate and sodium acetate, and fifth, separating ionone from the said semicarbazone of beta-ionone, substantially as described.

In witness whereof I have hereunto signed my name in the presence of two subscribing witnesses.

JOHANN CARL WILHELM FERDINAND TIEMANN.

Witnesses:
  OTTO HERING,
  GUSTAV HULSMANN.